United States Patent
Winfree et al.

(10) Patent No.: US 10,472,065 B2
(45) Date of Patent: Nov. 12, 2019

(54) HOVERING AIRCRAFT BELLY BAR CLASP

(71) Applicant: Quanta Associates, LP, Houston, TX (US)

(72) Inventors: Gordon Brent Winfree, Naples, FL (US); Mike Patton, Aurora, OR (US)

(73) Assignee: Quanta Associates, L.P., Houston, TX (US)

( * ) Notice: Subject to any disclaimer, the term of this patent is extended or adjusted under 35 U.S.C. 154(b) by 549 days.

(21) Appl. No.: 15/152,785

(22) Filed: May 12, 2016

(65) Prior Publication Data
US 2016/0332728 A1 Nov. 17, 2016

Related U.S. Application Data

(60) Provisional application No. 62/160,107, filed on May 12, 2015.

(51) Int. Cl.
*B64D 1/22* (2006.01)
*B64C 27/04* (2006.01)
*H02G 1/02* (2006.01)

(52) U.S. Cl.
CPC ............. *B64D 1/22* (2013.01); *B64C 27/04* (2013.01); *H02G 1/02* (2013.01)

(58) Field of Classification Search
CPC .......... B64C 27/04; B64C 1/22; B64C 13/04; B64C 13/02; B64C 11/42; B64C 1/34; B64C 11/44; H02G 1/02; H02J 1/08; H02J 2007/0067; H02J 7/0019; H02J 7/0054; H02J 7/0065; H02J 7/02; B64D 1/22; Y10T 307/313
See application file for complete search history.

(56) References Cited

U.S. PATENT DOCUMENTS

| | | | | | |
|---|---|---|---|---|---|
| 1,935,283 | A | * | 11/1933 | Adams | B64D 1/22 258/1.8 |
| 2,651,533 | A | * | 9/1953 | Miller | B66C 1/34 294/82.1 |
| 3,036,797 | A | * | 5/1962 | Agusta | B64C 1/22 244/137.1 |
| 3,044,818 | A | * | 7/1962 | Tobey | B64C 1/22 244/118.1 |

(Continued)

OTHER PUBLICATIONS

Air Rescue Systems, Heli-Bridle PSD (Portable Safety Device), 2015, 1 page, Ashland, or, USA.

(Continued)

*Primary Examiner* — Medhat Badawi
(74) *Attorney, Agent, or Firm* — Oathout Law Firm; Mark A. Oathout

(57) ABSTRACT

A belly bar method and apparatus use to attach, carry and release external cargo from a hovering aircraft. The belly bar apparatus has articulated tubing tool connected to an airframe of the hovering aircraft at a first mounting end and at a second mounting end. The articulated tubing tool has a first external catch and a second external catch mounted on the articulated tubing tool. The first external catch is manually configured for optional attach, carry and release of the external cargo via the cyclic. The second external catch is electronically configured for optional attach, carry and release of the external cargo proximate the collective.

7 Claims, 10 Drawing Sheets

(56) References Cited

U.S. PATENT DOCUMENTS

| | | | | |
|---|---|---|---|---|
| 3,265,336 A * | 8/1966 | Peterson | B64C 1/22 | 244/137.4 |
| 3,554,468 A * | 1/1971 | McVicar | B64D 1/22 | 244/137.4 |
| 3,601,342 A * | 8/1971 | Piasecki | B64D 1/22 | 212/230 |
| 3,602,544 A * | 8/1971 | Marsh | B64D 1/22 | 212/82 |
| 3,608,948 A * | 9/1971 | Kendall | B64D 1/22 | 294/82.15 |
| 3,656,796 A * | 4/1972 | Cook | B66C 1/16 | 294/74 |
| 3,690,602 A * | 9/1972 | Marsh | B64D 1/22 | 244/137.4 |
| 3,829,052 A * | 8/1974 | Flannelly | F16F 15/06 | 248/568 |
| 3,838,836 A * | 10/1974 | Asseo | B64D 1/22 | 244/137.4 |
| 3,904,156 A * | 9/1975 | Smith | B64D 1/22 | 244/118.1 |
| 3,946,971 A * | 3/1976 | Chadwick | B64D 1/08 | 244/137.4 |
| 4,124,181 A * | 11/1978 | Kolwey | B64D 1/22 | 244/137.1 |
| 4,138,078 A * | 2/1979 | Hester | B64D 9/00 | 244/137.4 |
| 4,142,698 A * | 3/1979 | Niebanck | B64C 25/00 | 244/17.17 |
| 4,311,213 A * | 1/1982 | Desjardins | B64C 27/001 | 188/380 |
| 4,378,919 A * | 4/1983 | Smith | B64D 1/22 | 244/118.1 |
| 4,519,559 A * | 5/1985 | Logan | B64C 25/52 | 244/104 FP |
| 4,553,719 A * | 11/1985 | Ott | B64D 9/00 | 244/118.1 |
| 4,558,837 A * | 12/1985 | Mens | B64C 25/00 | 244/104 FP |
| 4,609,168 A * | 9/1986 | Dean | A61G 3/0891 | 244/118.1 |
| 4,826,109 A * | 5/1989 | Camus | B64D 1/22 | 244/137.4 |
| 4,881,601 A * | 11/1989 | Smith | B64D 1/16 | 169/53 |
| 4,984,757 A * | 1/1991 | Hartung | B64D 1/22 | 144/24.13 |
| 5,143,326 A * | 9/1992 | Parks | B64D 1/22 | 244/118.1 |
| 5,190,250 A * | 3/1993 | Delong | B64D 1/22 | 244/118.1 |
| 5,273,333 A * | 12/1993 | Hatfield | B66C 1/34 | 294/82.26 |
| 5,339,580 A * | 8/1994 | Koshika | E04B 1/985 | 248/632 |
| 5,344,203 A * | 9/1994 | Tollenaere | B64D 1/22 | 244/137.1 |
| 5,352,056 A * | 10/1994 | Chandler | B66C 1/66 | 294/82.1 |
| 5,456,341 A * | 10/1995 | Garnjost | B60G 17/018 | 188/378 |
| 5,499,785 A * | 3/1996 | Roberts | B64D 1/12 | 244/118.1 |
| 5,562,394 A * | 10/1996 | Brown, Jr. | B66C 1/66 | 294/67.31 |
| 5,613,722 A * | 3/1997 | Fandrich | B66C 1/585 | 294/110.1 |
| 5,826,825 A * | 10/1998 | Gabriel | B64D 1/22 | 244/137.1 |
| 5,836,548 A * | 11/1998 | Dietz | B64D 1/08 | 244/137.1 |
| 5,850,991 A * | 12/1998 | Hainsworth | B64D 1/22 | 244/137.1 |
| 6,189,834 B1 * | 2/2001 | Dietz | B64D 1/08 | 244/118.1 |
| 6,202,960 B1 * | 3/2001 | Travis | B64C 25/58 | 188/380 |
| 6,533,220 B2 * | 3/2003 | Schuster | B64D 1/22 | 244/118.1 |
| 6,708,926 B2 * | 3/2004 | Bonisch | B64C 1/22 | 244/1 TD |
| 6,983,833 B2 * | 1/2006 | Ivers | F16F 7/104 | 188/379 |
| 7,461,729 B2 * | 12/2008 | Manfredotti | B64C 27/001 | 188/379 |
| 7,720,582 B2 * | 5/2010 | Makinadjian | B64C 25/60 | 244/100 R |
| 7,887,011 B1 * | 2/2011 | Baldwin | B64C 37/02 | 244/118.1 |
| 7,918,417 B2 * | 4/2011 | Mouille | B64C 25/52 | 244/108 |
| 7,948,237 B2 * | 5/2011 | Kuzmin | G01V 3/16 | 324/330 |
| 8,172,184 B2 * | 5/2012 | Spencer | B66C 1/36 | 244/137.1 |
| 8,226,042 B1 * | 7/2012 | Howell | B63B 27/36 | 244/137.4 |
| 8,292,229 B2 * | 10/2012 | Pancotti | B64C 1/1415 | 244/129.5 |
| 8,534,607 B2 * | 9/2013 | Tardiff | B64D 17/38 | 244/137.1 |
| 8,534,608 B1 * | 9/2013 | Cox, IV | A01G 23/095 | 244/118.1 |
| 8,636,250 B2 * | 1/2014 | Toni | B64C 1/061 | 244/118.1 |
| 8,708,115 B2 * | 4/2014 | Herold | F16F 7/1011 | 188/380 |
| 8,888,048 B2 * | 11/2014 | Figoureux | B64D 1/22 | 244/118.1 |
| 8,915,466 B2 * | 12/2014 | Figoureux | B66C 23/18 | 244/136 |
| 9,027,976 B1 * | 5/2015 | Tollenaere | B64D 1/22 | 244/137.4 |
| 9,205,922 B1 * | 12/2015 | Bouwer | B64D 9/00 | |
| 9,242,741 B1 * | 1/2016 | Cockell, II | B64D 17/383 | |
| 10,023,313 B2 * | 7/2018 | Behrens | F16M 13/02 | |
| 2005/0242237 A1 * | 11/2005 | Scott | B64C 7/00 | 244/118.1 |
| 2010/0051890 A1 * | 3/2010 | Lauder | B64C 27/10 | 254/382 |
| 2011/0095132 A1 * | 4/2011 | Manfredotti | B64C 27/001 | 244/122 R |
| 2011/0186686 A1 * | 8/2011 | Ferrendier | B64C 1/22 | 244/137.4 |
| 2011/0192932 A1 * | 8/2011 | Brenner | B64C 27/04 | 244/17.13 |
| 2012/0145832 A1 * | 6/2012 | Schuster | B64D 1/22 | 244/137.4 |
| 2012/0292434 A1 * | 11/2012 | Welsh | B64C 27/001 | 244/17.27 |
| 2012/0318916 A1 * | 12/2012 | Kroener | B64C 27/04 | 244/118.1 |
| 2013/0056586 A1 * | 3/2013 | Occhiato | B64D 1/22 | 244/137.4 |
| 2013/0270393 A1 * | 10/2013 | Shrapnel | B64D 1/22 | 244/137.4 |
| 2013/0299634 A1 * | 11/2013 | Haggard | B64D 1/00 | 244/110 F |
| 2014/0252170 A1 * | 9/2014 | Prud'Homme-Lacroix | B64C 7/00 | 244/121 |
| 2015/0360779 A1 * | 12/2015 | Behrens | B64D 1/22 | 244/137.4 |
| 2016/0048131 A1 * | 2/2016 | Lesperance | B64D 1/22 | 701/8 |
| 2016/0236779 A1 * | 8/2016 | Thomas | B64D 1/22 | |
| 2016/0332728 A1 * | 11/2016 | Winfree | B64D 1/22 | |

(56) References Cited

U.S. PATENT DOCUMENTS

2016/0340039 A1* 11/2016 Waltner .................. B64D 1/22
2017/0283056 A1* 10/2017 Mons ...................... B64D 1/22
2018/0099748 A1* 4/2018 Lesperance ............ B64C 27/04

OTHER PUBLICATIONS

U.S. Department of Transportation: Federal Aviation Administration, Classifying and Using a Belly Band System as a Portable Safety Device (PSD) in Part 133 Operations, InFO Information for Operators, Sep. 10, 2012, 2 pages, InFO 12015, Washington, D.C., USA.

* cited by examiner

HOVERING AIRCRAFT BELLY BAR CLASP

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Technical Field

The disclosure relates to devices and techniques for attaching, releasing and carrying external loads from a helicopter or other hovering flight vehicle. Such helicopters are used, for example, in techniques to install, repair and maintain electric transmission lines (a high voltage environment).

Current or conventional helicopter operations which utilize human external cargo to install, repair and/or maintain, for example, remote utility lines do so by the way a "belly band" (a strap which is fitted through the cabin of the helicopter encircling the helicopter that provides a secondary point of attachment and release outside of and below the helicopter). Release is achieved with an integrated release mechanism. The release mechanism requires the pilot to release the flight controls in order to activate the release mechanism for the human external cargo. Within the context of the foregoing consider that the reaction time of the operator is critical to successful operation of the release mechanism in an emergency situation while piloting or maneuvering the helicopter. Further one must also be concerned with the inadvertent release of the cargo load (human or otherwise).

SUMMARY

A belly bar method and apparatus used to catch human external cargo in the event of a failure or unintended release from the primary attachment (i.e. cargo hook, etc.) and provide the temporary emergency carriage and provide a system of release of the human external cargo from a hovering aircraft. The belly bar apparatus has articulated tubing tool connected to an airframe of the hovering aircraft at a first mounting end and at a second mounting end. The articulated tubing tool has a secondary external catch mounted on the articulated tubing tool. The primary external catch (aircraft mounted cargo hook) is configured for attachment, carriage and manual or electronic release of the external cargo via the cyclic mounted controls. The secondary external catch is configured for temporary emergency carriage and electronic and/or manual release of the external cargo via the collective mounted controls.

All pins described herein may take various forms as known to one having ordinary skill in the art.

BRIEF DESCRIPTION OF THE DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DESCRIPTION OF EMBODIMENT(S)

The description that follows includes exemplary apparatus, methods, techniques, and instruction sequences that embody techniques of the inventive subject matter. However, it is understood that the described embodiments may be practiced without these specific details.

Figure 1:
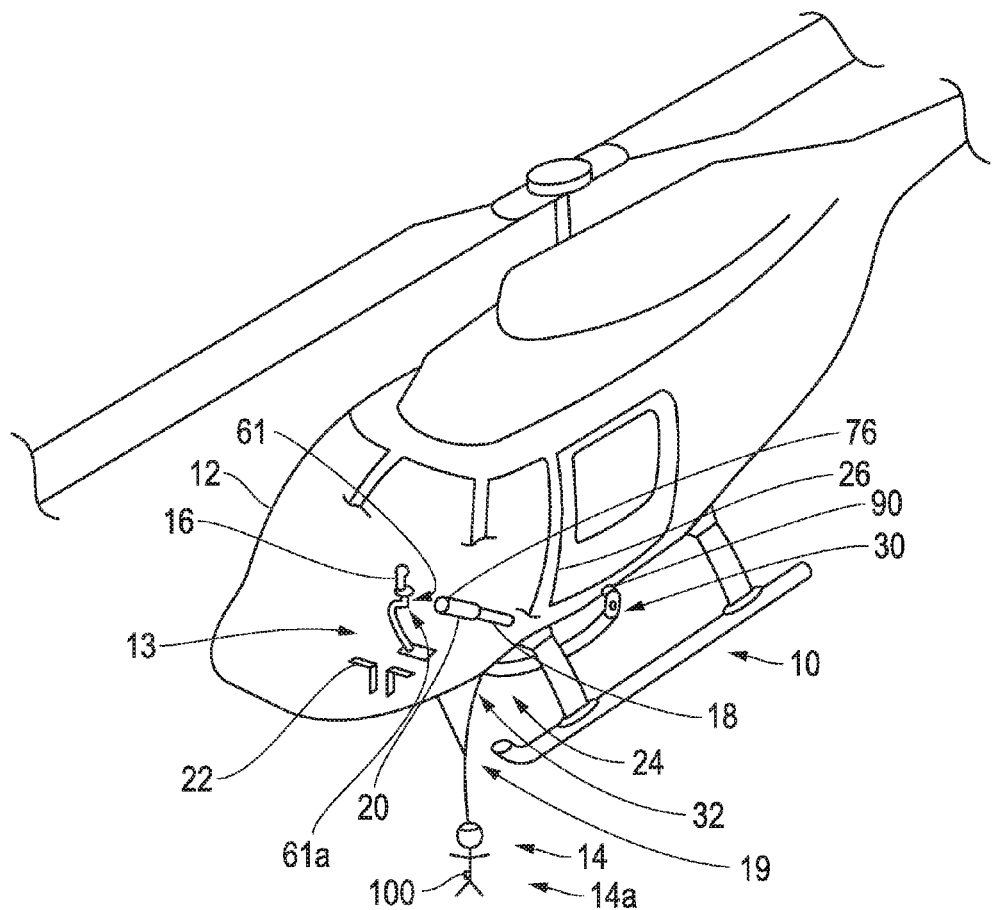
FIG. 1 depicts a schematic diagram of a hovering aircraft with a belly bar clasping system according to one embodiment.
Figure 1A:
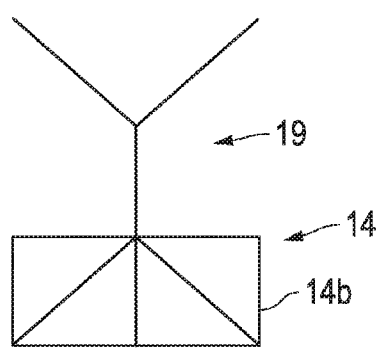
FIG. 1A depicts another embodiment showing other external cargo which may be carried by the hovering aircraft with a belly bar clasping system of FIG. 1.
Figure 2:
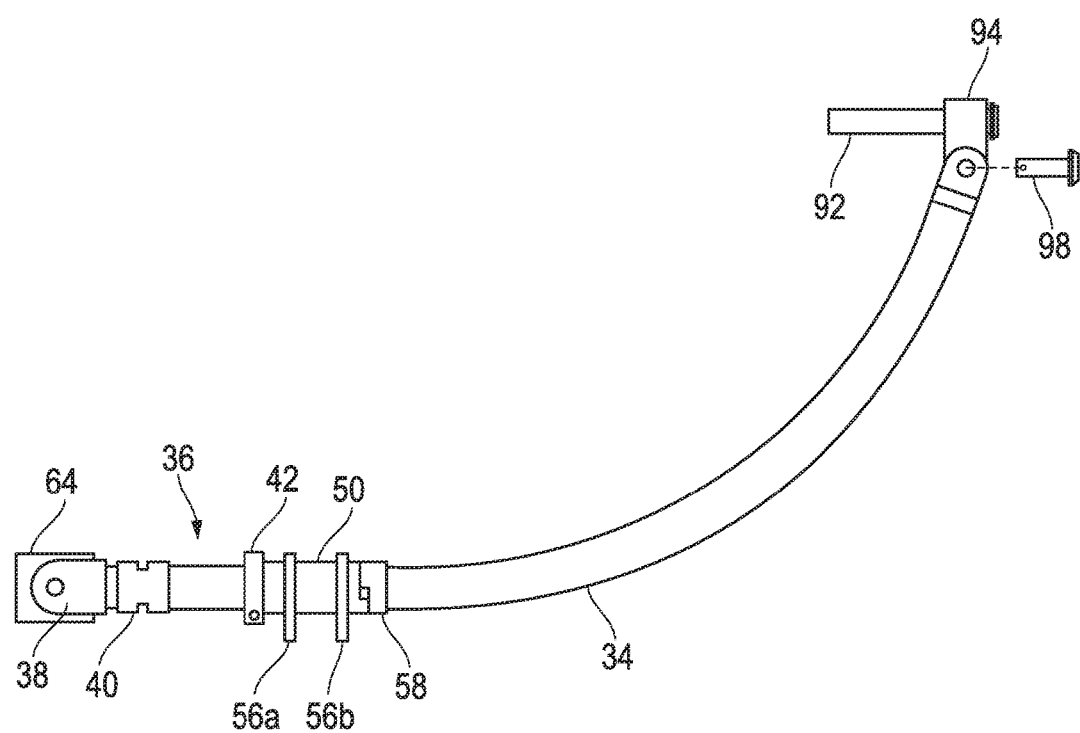
FIG. 2 depicts an elevation view of a belly bar clasp according to one embodiment.
Figure 3:
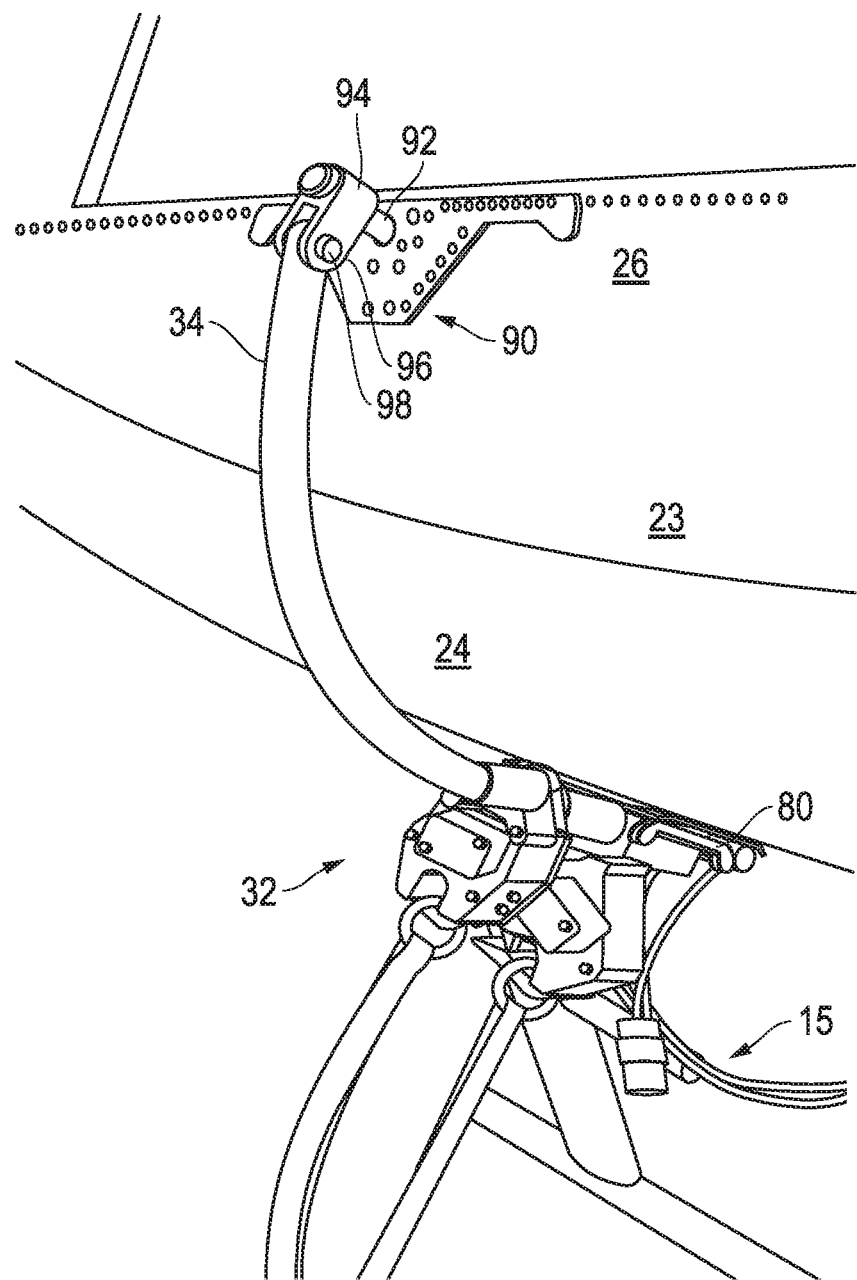
FIG. 3 depicts a perspective view of a portion of the belly bar clasping system mounted to the hovering aircraft according to one embodiment.
Figure 4:
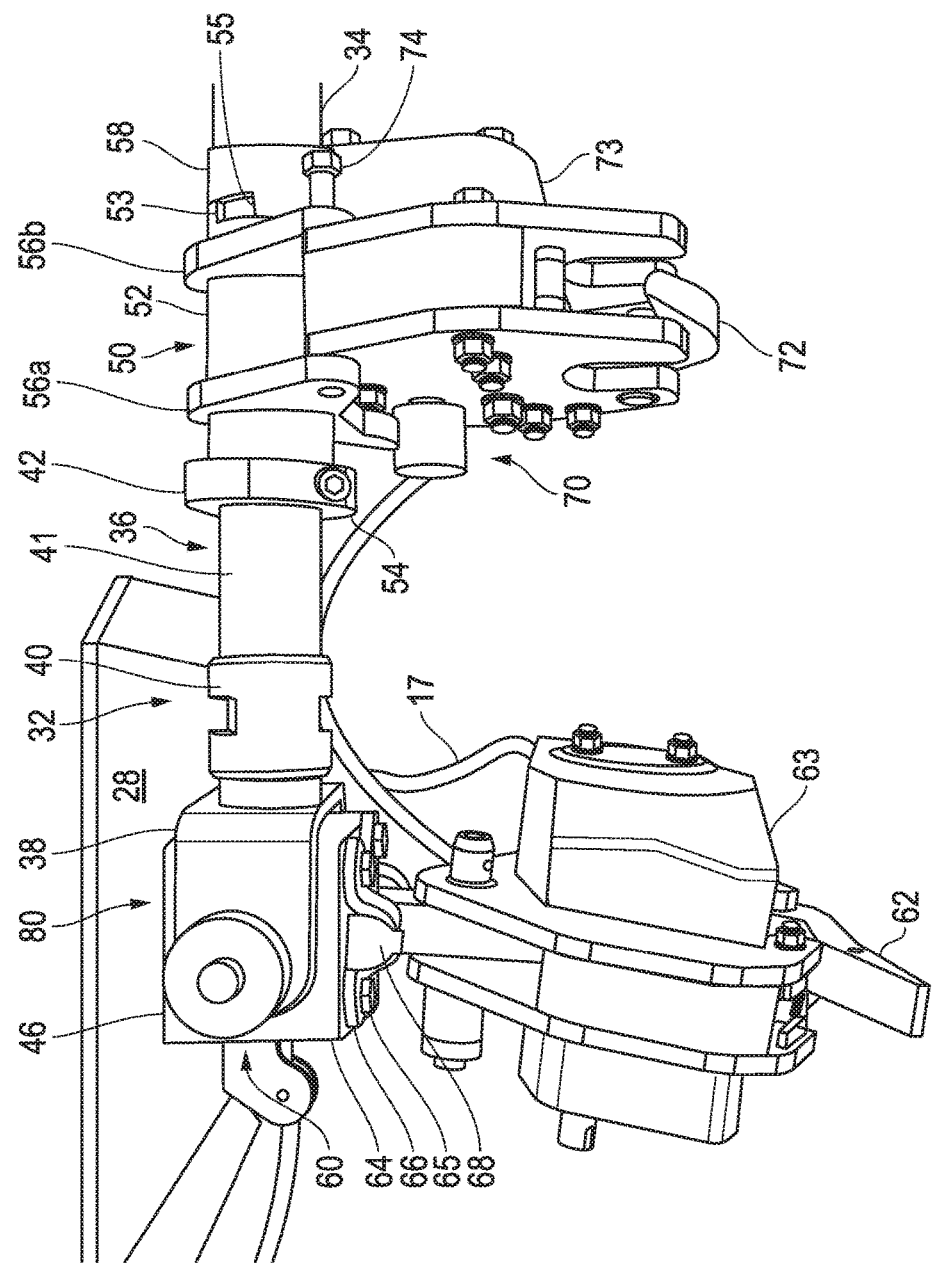
FIG. 4 depicts a perspective view of a portion of the belly bar clasping system mounted below the hovering aircraft according to one embodiment.

FIG. 1 shows a schematic diagram depicting a hovering aircraft belly bar clasping system 10. In an exemplary embodiment the hovering aircraft belly bar clasping system 10 generally includes a hovering aircraft or helicopter 12 and a belly bar clasping system 30. The helicopter 12 totes the belly bar clasp 30 (which may also be referred to as a "BELLY BAR") which may be used to catch and temporarily carry and provide a release for external cargo 14. Such external cargo 14 includes human external cargo (e.g. workers) 14*a* and/or other external cargo 14*b* (FIG. 1A). Human external cargo workers 14*a* may be, for example, linemen, pilots, emergency rescue workers, and the like. The workers 14*a* may, for example, work with, near, repair, maintain and/or install electric transmission lines.

The exemplary helicopter 12 has a control center 13 and as shown has a cyclic 16, a collective 18 including a throttle 20, pedals 22, and an airframe 23 including an airframe belly (i.e. underside) 24 which merges into airframe sidewalls 26. The belly bar clasping system 30 mounts to the helicopter 12. The external cargo 14 may be attached to, carried by and/or released from the belly bar clasping system 30 via straps 19 or the like.

Now referring to FIGS. 1-4, the belly bar clasping system 30 in an exemplary embodiment generally has an articulated tubing tool 32, a second or secondary external catch 72, a first mounting end 80 and a second mounting end 90. The belly bar clasping system 30 mounts under the airframe belly 24 at the first mounting end 80 and at the second mounting end 90 proximate the airframe sidewall 26 or region where the airframe belly 24 merges into the airframe sidewall 26.

The articulated tubing tool 32 in the exemplary embodiment shown generally has bent shaft (tubing or bar) 34, a connector shaft (tube or bar) 36 and a second or secondary external catch mount 70. The entire articulated tubing tool 32 or various components may be made of metal (preferably steel or an alternative lighter weight metal) or be filament wound, compression molded, transfer molded, cast, machined from a plastic, composite, metal, elastomer, '3D printed' or any combination thereof.

Figure 5:
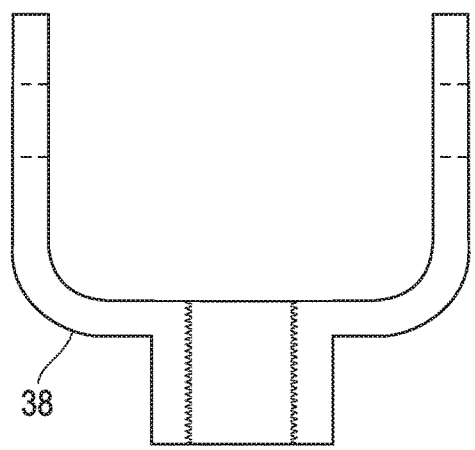
FIG. 5 depicts a top view of one embodiment of a fork.
Figure 6:
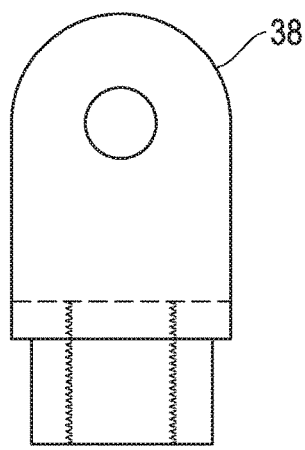
FIG. 6 depicts a side view of the fork embodiment shown in FIG. 5.
Figure 7:
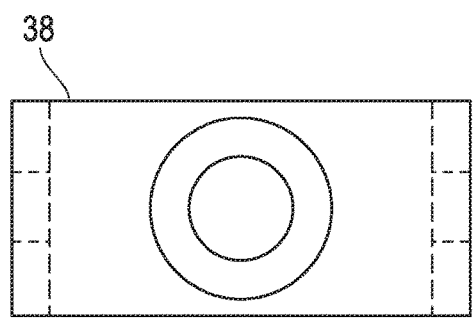
FIG. 7 depicts an end view of the fork embodiment shown in FIG. 5.
Figure 8:
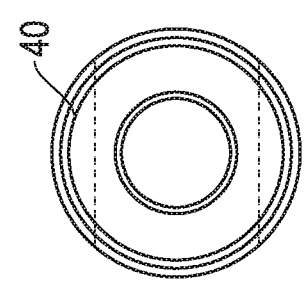
FIG. 8 depicts a side view of one embodiment of a connector/jam nut.
Figure 9:
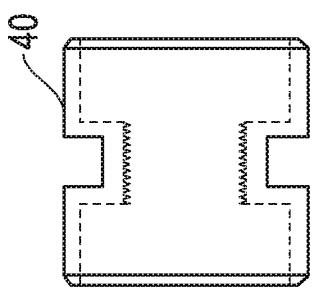
FIG. 9 depicts an end view of the connector/jam nut embodiment shown in FIG. 8.
Figure 10:
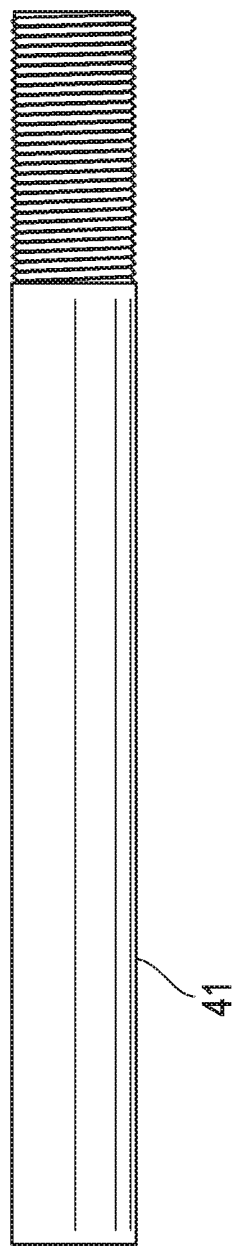
FIG. 10 depicts a side view of one embodiment of a mid-shaft.
Figure 12:
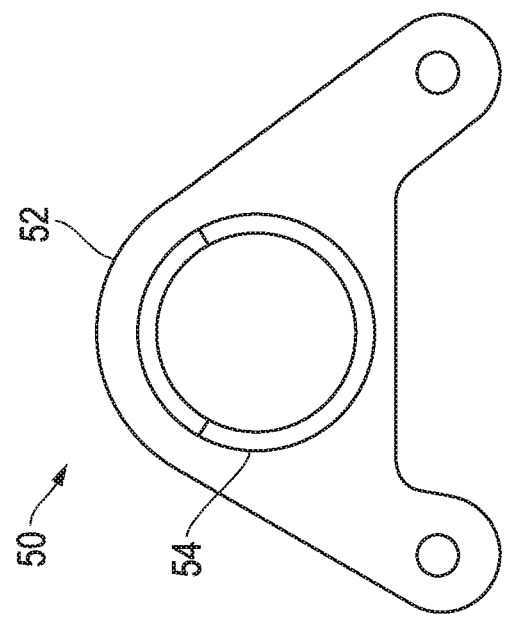
FIG. 12 depicts an end view of the hook swivel embodiment shown in FIG. 11.
Figure 11:
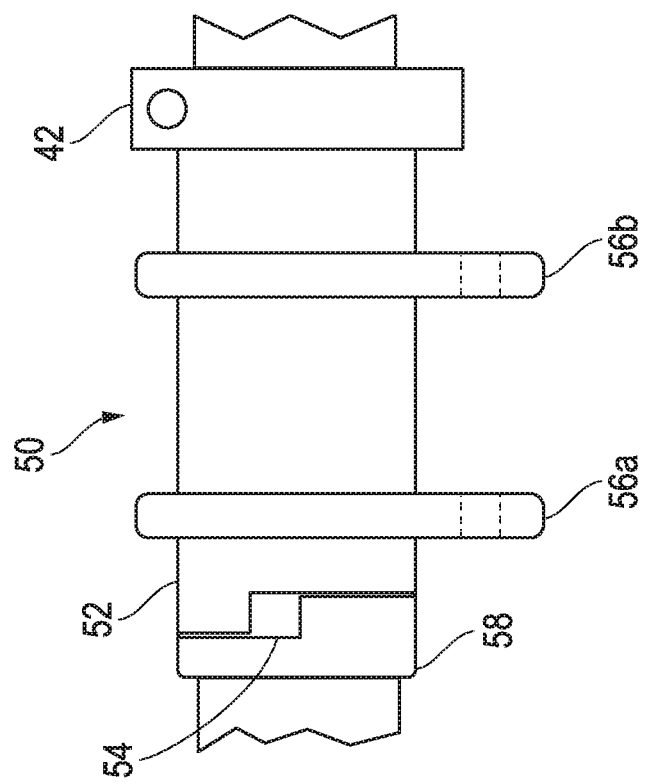
FIG. 11 depicts a side view of one embodiment of a hook swivel.

In the embodiment shown the connector shaft 36 has a fork 38, a connector/jam nut 40, a mid-shaft (tube or rod) 41, a lock collar/connector 42 and a hook swivel 50. The fork 38 (shown in FIGS. 5-7) is attached via, for example, a pin 46, to the first external catch mount 60 proximate the first mounting end 80. The connector/jam nut 40 (shown in FIGS. 8-9) secures the mid-shaft or rod 41 (shown in FIG. 10) to the fork 38. The lock collar/connector 42 secures the hook swivel 50 (shown in FIGS. 11-12) around the mid-shaft 41. The mid-shaft 41 extends through the inside of the hook swivel 50 and connects to the bent shaft 34. The hook swivel 50 pivots around the bent shaft 34. The journal 52 includes a first travel stop 53 and the swivel stop collar 58 includes a second travel stop 55 that limits rotation of the journal 52 about mid-shaft 41. In one exemplary embodiment the rotation is limited to about thirty degrees although other angles desirable to one using second external catch mount 70 may be implemented. The hook swivel 50 includes two secondary hook attachments/mounting flanges 56a & 56b for connecting the journal 52 to the second external catch mount 70 via pin(s) 74.

Figure 14:
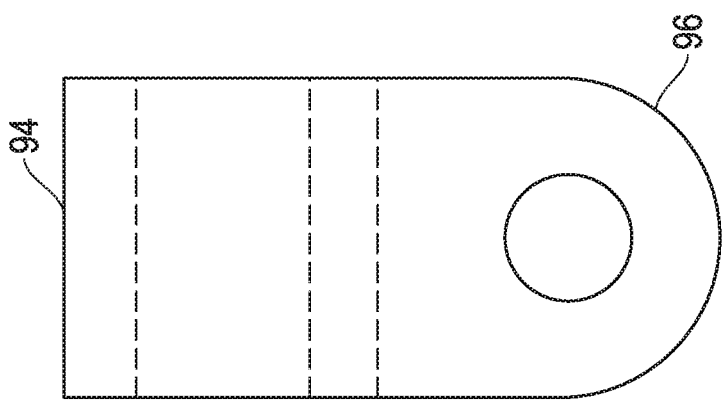
FIG. 14 depicts an end view of the hinge embodiment shown in FIG. 13.
Figure 13:
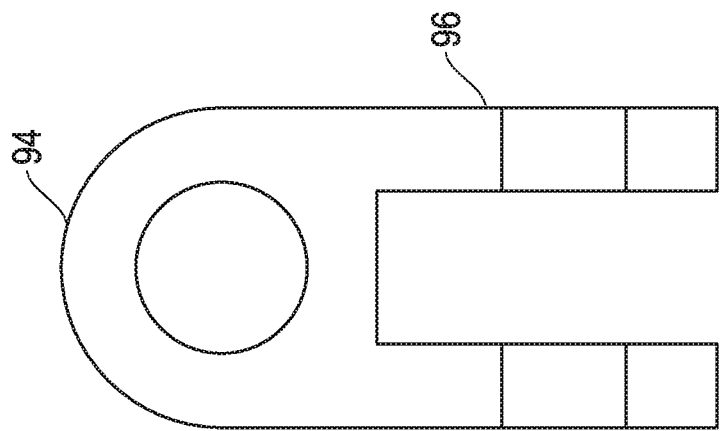
FIG. 13 depicts a side view of one embodiment of a hinge.
Figure 15B:
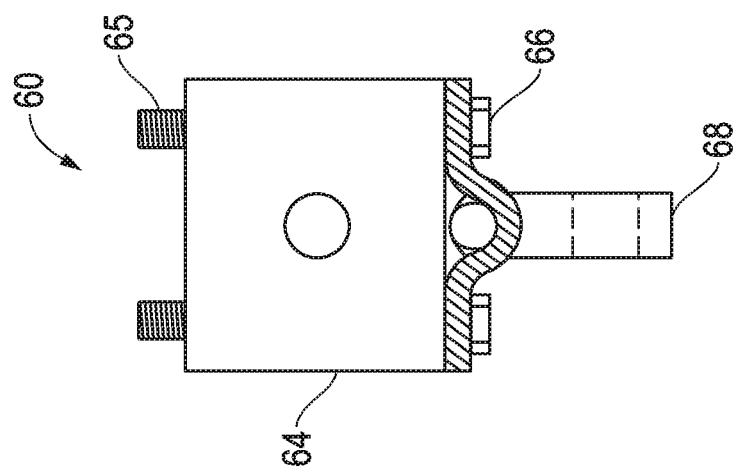
FIGS. 15A & 15B depict elevation views of an embodiment of a primary external catch mount with spacer block, saddle and a pivot link.
Figure 15A:
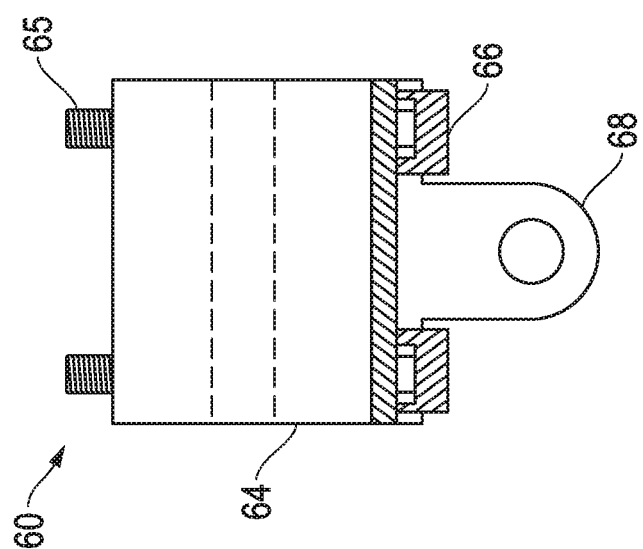
Figure 16:
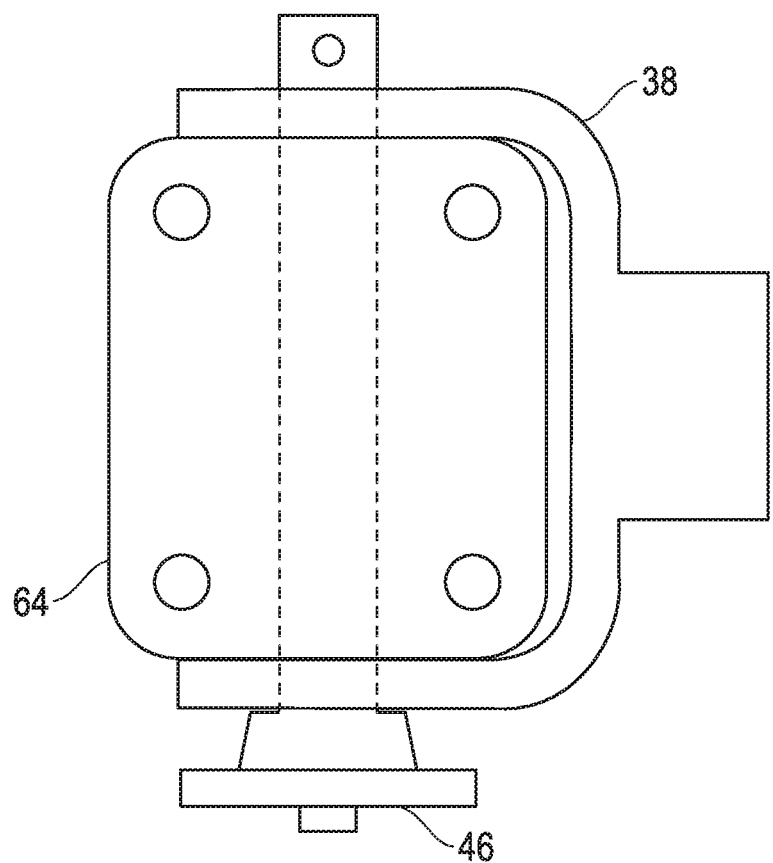
FIG. 16 depicts a bottom view of an embodiment of a fork connected to a spacer.

The bent shaft 34 connects to the second mounting end 90. The second mounting end 90 includes a jackpoint pin 92 (see FIG. 2). A hinge 94 (shown in FIGS. 13-14) is joined over the jackpoint pin 92 and sidewalls 96 of the hinge 94 are connected to the bent shaft 34 via a hinge pin 98 (see FIG. 2).

Referring to FIGS. 2, 4, & 15-16, the first external catch mount 60 includes a spacer 64 (pinned to fork 38) joined by bolts 65 via a mounting plate 28 to the airframe belly 24 at first end 80. Saddles 66 are attached to the spacer 64 via bolts 65. The saddles 66 hold a pivot link or pin 68 joining the spacer 64 to the first external catch 62.

First external catch 62 is generally a hooking device and has a hook actuator 63 in communication with the control center 13 via manually actuated cable 17 (alternatively communication lines 15, hard wired as shown The first external catch 62 may be an off the shelf commercially available catch such as, for example, those available from Breeze-Eastern Corporation of Whippany, N.J., USA.

Second external catch 72 is generally a back-up hooking device and has a hook actuator 73 in communication with the control center 13 via communication lines 15 (hard wired as shown but may also be wireless including transmitter(s)/receiver(s)). The second external catch 72 may also be an off the shelf commercially available catch such as, for example, those available from Mechanical Specialties of Olympia, Wash., USA.

In alternative embodiments the human external cargo workers 14a may have a controller 100 linked (e.g. via wireless or the like) to the control center 13 and or hook actuator 63 to allow the human external cargo workers 14a to activate open or release the first external catch 62 and/or second external catch 72 in an emergency situation.

In one working example for use of the hovering aircraft belly bar clasping system 10, the first external catch 62 may be the primary catch and the second external catch 72 may be a back-up catch (both must be released for release of the external cargo 14). The first external catch 62 is a manual release system activated by a manually actuated handle, lever, button (or the like) 61 located on the cyclic 16 and a control cable (manually actuated cable 17) connecting the handle, lever, button (or the like) 61 to the first external catch 62 by way of the hook actuator 63. A pull safety pin 61a may also be implemented into the manually actuated handle, button (or the like) located on the cyclic 16. The second external catch 72 (in this case a back-up system) is an electronically activated release system with a protected (recessed) button 76 proximate the collective 18, relay lines (communication wire 15), an electronic hook actuator 73 to actuate release of second external catch 72. The electronic circuit may normally be de-energized requiring power to actuate the electronic hook actuator 73 for release of the second external catch 72.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A belly bar clasping apparatus for use to attach, carry and release an external cargo from a hovering aircraft, the apparatus comprising:
   an articulated tubing tool connected to an airframe of the hovering aircraft at a first mounting end and at a second mounting end;
   wherein said articulated tubing tool comprises a first external catch on said articulated tubing tool and a second external catch on said articulated tubing tool;
   wherein said first external catch and said second external catch are respectively configured for optional attach, carry and release of the external cargo;
   wherein said articulated tubing tool further comprises a bent shaft connected to a connector shaft;
   wherein said first external catch and said second external catch are mounted to the connector shaft; and wherein the connector shaft comprises:
  a fork;
  a mid-shaft joined to said fork;
  a connector for securing the mid-shaft to said fork;
  a hook swivel adjacent the mid-shaft; and
  a lock collar for securing said hook swivel to the mid-shaft.

2. The belly bar clasping apparatus according to claim 1, wherein the connector shaft further comprises a swivel stop collar attached to said bent shaft and mounted in interfering relationship with said hook swivel.

3. The belly bar clasping apparatus according to claim 2, wherein said hook swivel comprises:
  a journal which rotates on said bent shaft;
  a secondary hook attachment flange positioned on the journal; and
  a first travel stop on the journal and in interfering relationship with said swivel stop collar.

4. The belly bar clasping apparatus according to claim 3, further comprising a hinge connected to a mounting end of said bent shaft via a hinge pin; and a jackpoint pin for connecting the hinge to the hovering aircraft.

5. The belly bar clasping apparatus according to claim 3, further comprising a spacer for connection to said fork; and wherein the spacer is for connecting the articulated tubing tool to the hovering aircraft.

6. The belly bar clasping apparatus according to claim 1, further comprising a manually actuated cable connecting said first external catch to a cyclic located in the hovering aircraft; wherein said first external catch is configured for manual release activated by a manually actuated lever located on the cyclic; and a communication line for connecting an electronic hook actuator on said second external catch to a button proximate a collective located in the hovering aircraft.

7. The belly bar clasping apparatus according to claim 1, wherein the external cargo is connected via a plurality of straps to said first external catch and said second external catch.

* * * * *